United States Patent [19]

Ohnishi et al.

[11] Patent Number: 5,408,910
[45] Date of Patent: Apr. 25, 1995

[54] VIBRATION PREVENTION DEVICE FOR BANDSAW MACHINES

[75] Inventors: Kenji Ohnishi, Isehara; Isomi Washio, Hatano; Koji Nakano, Odawara, all of Japan

[73] Assignee: Amada Company, Ltd., Japan

[21] Appl. No.: 200,688

[22] Filed: Feb. 23, 1994

Related U.S. Application Data

[60] Division of Ser. No. 105,688, Aug. 13, 1993, Pat. No. 5,301,586, which is a division of Ser. No. 884,943, May 18, 1992, Pat. No. 5,271,306, which is a division of Ser. No. 774,614, Oct. 10, 1991, Pat. No. 5,127,297, which is a continuation of Ser. No. 561,824, Aug. 2, 1990, Pat. No. 5,067,381, which is a division of Ser. No. 156,819, Feb. 17, 1988, Pat. No. 4,972,746.

[30] Foreign Application Priority Data

Feb. 18, 1987 [JP] Japan .................. 62-021427

[51] Int. Cl.6 ............................................. B23D 55/08
[52] U.S. Cl. ............................................. 83/820; 83/823
[58] Field of Search .................. 83/820, 814, 821, 823, 83/825, 827, 828, 829, 661, 815

[56] References Cited

U.S. PATENT DOCUMENTS

| | | | |
|---|---|---|---|
| 1,374,600 | 4/1921 | Newell | 83/820 |
| 2,934,106 | 4/1960 | Chapman et al. | 83/820 |
| 3,104,576 | 9/1963 | Robinson | 83/814 |
| 4,258,601 | 3/1981 | Tanabe | 83/820 |
| 4,290,330 | 9/1981 | Washio et al. | 83/820 |
| 4,364,294 | 12/1982 | Eccardt | 83/820 |
| 4,557,168 | 12/1985 | Tokiwa | |
| 4,702,137 | 10/1987 | Davidson et al. | 83/820 |

FOREIGN PATENT DOCUMENTS

| | | |
|---|---|---|
| 0011318 | 10/1979 | European Pat. Off. |
| 2435992 | 9/1979 | France |
| 2041822 | 9/1980 | United Kingdom |

Primary Examiner—Scott A. Smith
Attorney, Agent, or Firm—Wigman, Cohen, Leitner & Myers

[57] ABSTRACT

A bandsaw machine which has a sawhead assembly in which a flexible endless bandsaw blade is trained around a pair of bandsaw blade wheels to cut a workpiece, with the blade being guided by a guide arm, includes a guide member on the guide arm, for holding the bandsaw blade in a vertical orientation by pushing the bandsaw blade from both sides. A rolling member is mounted on the sawhead assembly and is free to push a side surface of the bandsaw blade with a predetermined force so as to prevent vibration of the blade.

7 Claims, 18 Drawing Sheets

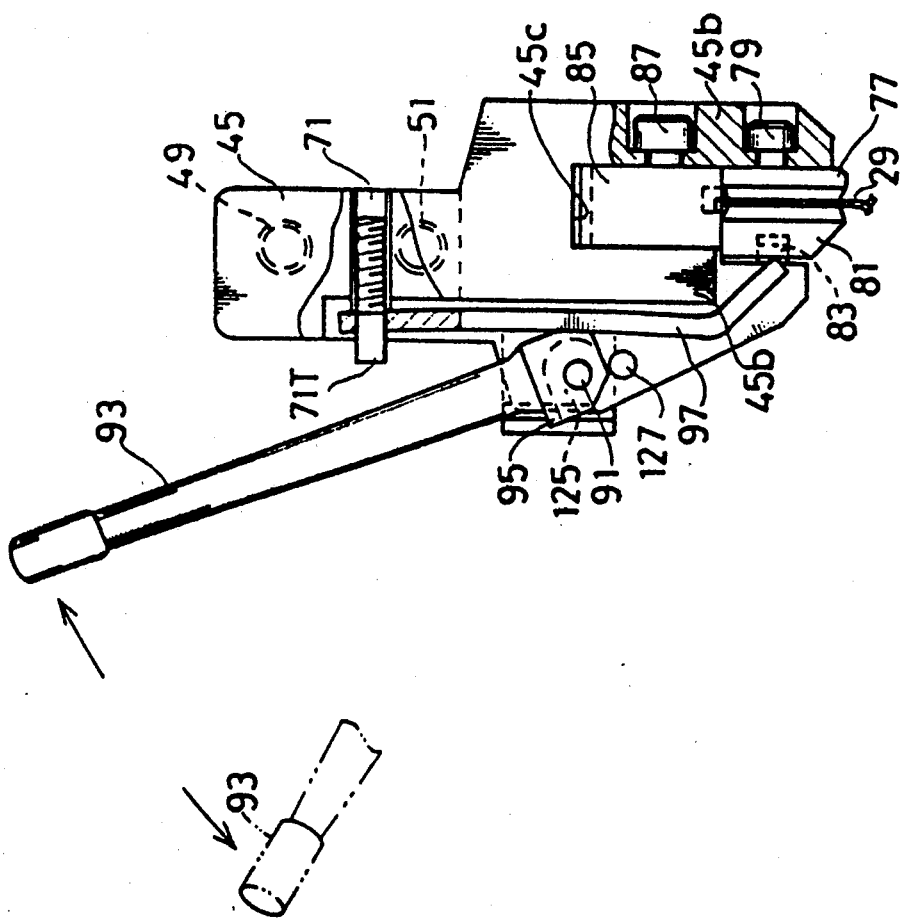
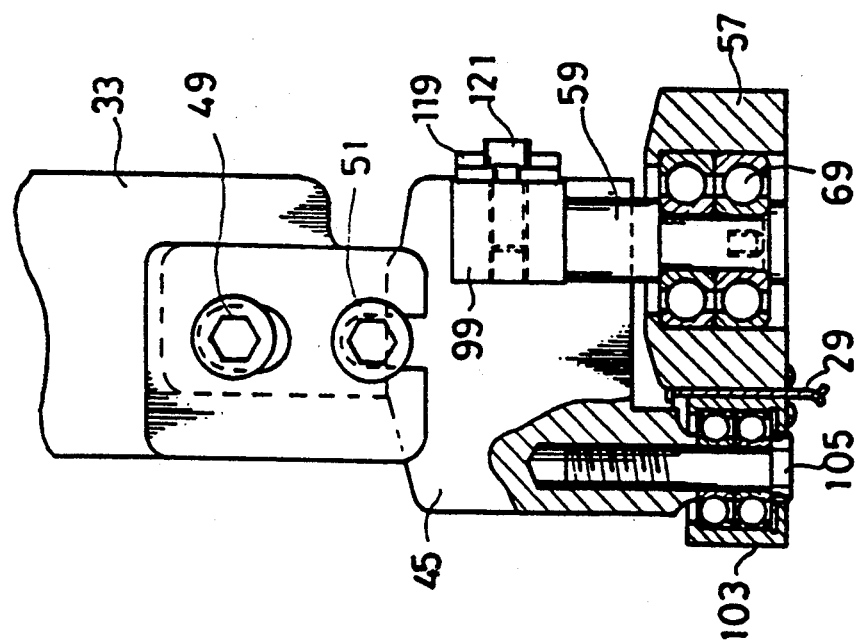

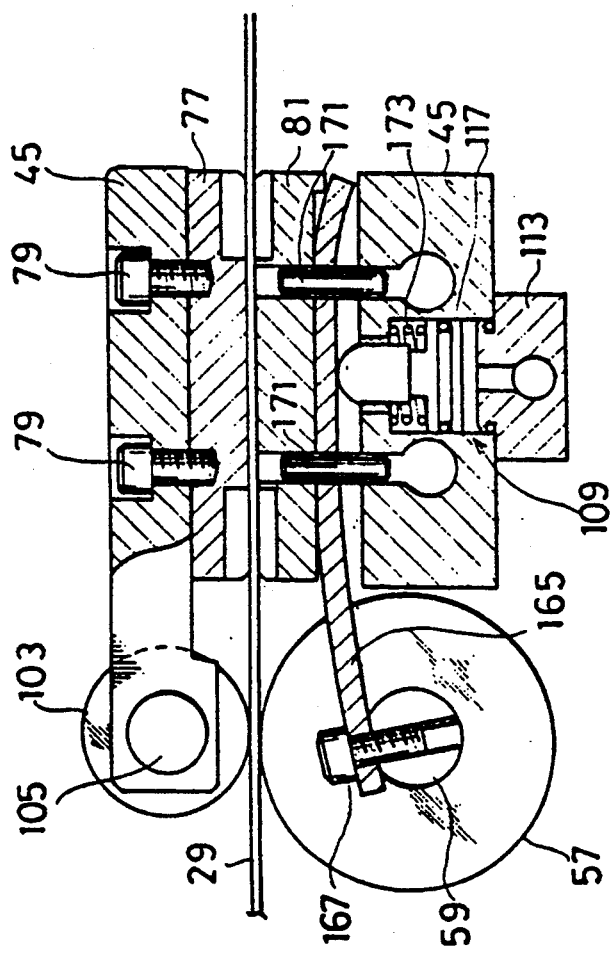
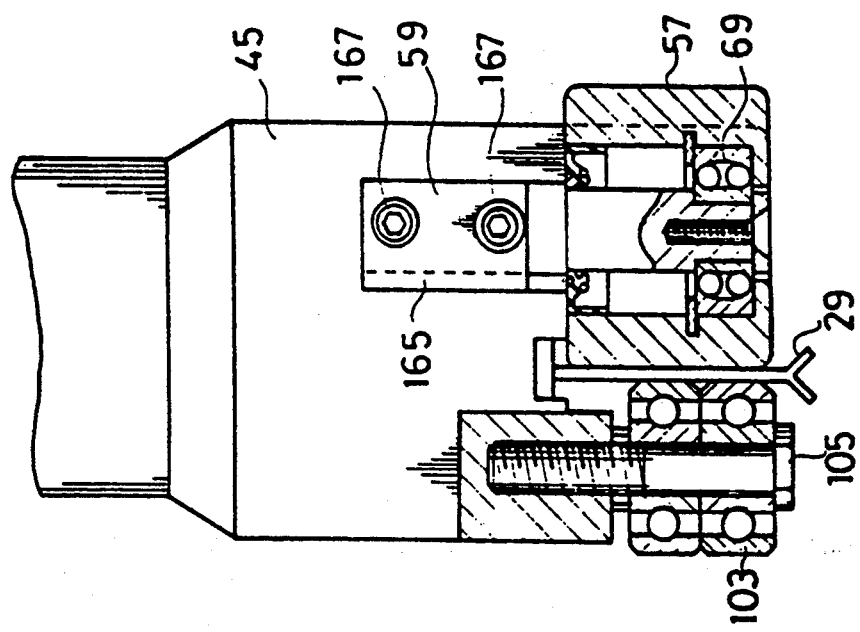

VIBRATION PREVENTION DEVICE FOR BANDSAW MACHINES

This is a divisional of application Ser. No. 80/105,688, filed on Aug. 13, 1993, U.S. Pat. No. 5,301,586, which is div. of Ser. No. 07/884,943, filed May 18, 1995, U.S. Pat. No. 5,271,306, which is div. of 07/774,614, filed Oct. 10, 1991, U.S. Pat. No. 5,127,297, which is a cont. of Ser. No. 07/561,824, filed Aug. 2, 1990, U.S. Pat. No. 5,067,381, which is div. of Ser. No. 07/156,819, filed Feb. 17, 1988, U.S. Pat. No. 4,972,746.

BACKGROUND OF THE INVENTION

1. Field of the Invention

This invention relates to a vibration prevention device for bandsaw machines, which can prevent vibration of a bandsaw blade.

2. Description of the Prior Art

It is known that bandsaw machines generally comprise a saw head assembly in which a flexible endless bandsaw blade is trained around a pair of bandsaw blade wheels so that it may perform cutting operations when the wheel are driven.

However, since bandsaw blades used in bandsaw machines are thin elastic blades with many cutting teeth, it is easy for vibrations to occur between the bandsaw blade guide device and the bandsaw blade wheel. In particular, during cutting of hard-to-cut materials such as stainless steel, a great deal of noise is produced, leading to complaints of public disturbance.

To prevent such cutting noise, various measures are taken such as follows:
  (i) increasing the rigidity of the main body of the bandsaw machine,
  (ii) attaching a partial cover that is soundproof,
  (iii) using a bandsaw blade with unequal pitch, and
  (iv) performing discontinuous load cutting such as vibration cutting.

However, a great deal of noise is still produced, creating a need for more countermeasures, especially against medium- and high-frequency noises.

SUMMARY OF THE INVENTION

Accordingly the main purpose of this invention is to provide a vibration prevention device for bandsaw machines, which can prevent vibration of the bandsaw blade making it possible to reduce noise, and is small in size and can be produced at low cost.

Another purpose of this invention is to provide the vibration prevention device which can effectively reduce noise by pushing a side surface of the bandsaw blade, with a most suitable force which is adjustable according to the size of the workplace to be cut.

Still another purpose of this invention is to provide a bandsaw blade guide device which comprises a bandsaw blade guide member for holding the bandsaw blade in a vertical orientation, and the vibration prevention device, and permits force holding the bandsaw blade in the bandsaw blade guide member orientation and force for suppressing noise in the vibration prevention device, to be adjusted independently.

In order to satisfy the above purposes, the vibration prevention device for a bandsaw machine that has a saw head assembly in which a flexible endless bandsaw blade is trained around a pair of bandsaw blade wheels to cut a workpiece, and guided by a bandsaw blade guide member mounted on a bandsaw guide arm, for holding the bandsaw blade in a vertical orientation, comprises a rolling member which is mounted on the saw head assembly and is free to push a side surface of the bandsaw blade.

According to the present invention, the noise produced by bandsaw blade vibration during cutting is reduced due to vibration suppression. The effect is particularly significant when cutting hard-to-cut material and when the bandsaw blade is worn. Reductions of 10 to 20 dB in noise level are typical, with considerable reduction in medium- and high-frequency noise.

In addition, the vibration prevention device of this invention is smaller, more compact and lower in cost than previous devices.

These and other objects, features and advantages of the present invention will be more apparent from the following description of a preferred embodiment taken in conjunction with the accompanying drawings.

BRIEF DESCRIPTION OF THE DRAWINGS

FIG. 12 is a sectional view taken along line XII—XII of FIG. 10.

FIG. 13 is a sectional view taken along line XIII—XIII of FIG. 10.

FIG. 28 is a sectional view taken along line XXVIII—XXVIII of FIG. 26.

FIG. 29 a plan view, with portions broken away for clarity, of the bandsaw blade guide device provided with a eighth embodiment of the present invention.

DESCRIPTION OF THE PREFERRED EMBODIMENTS

Figure 1:
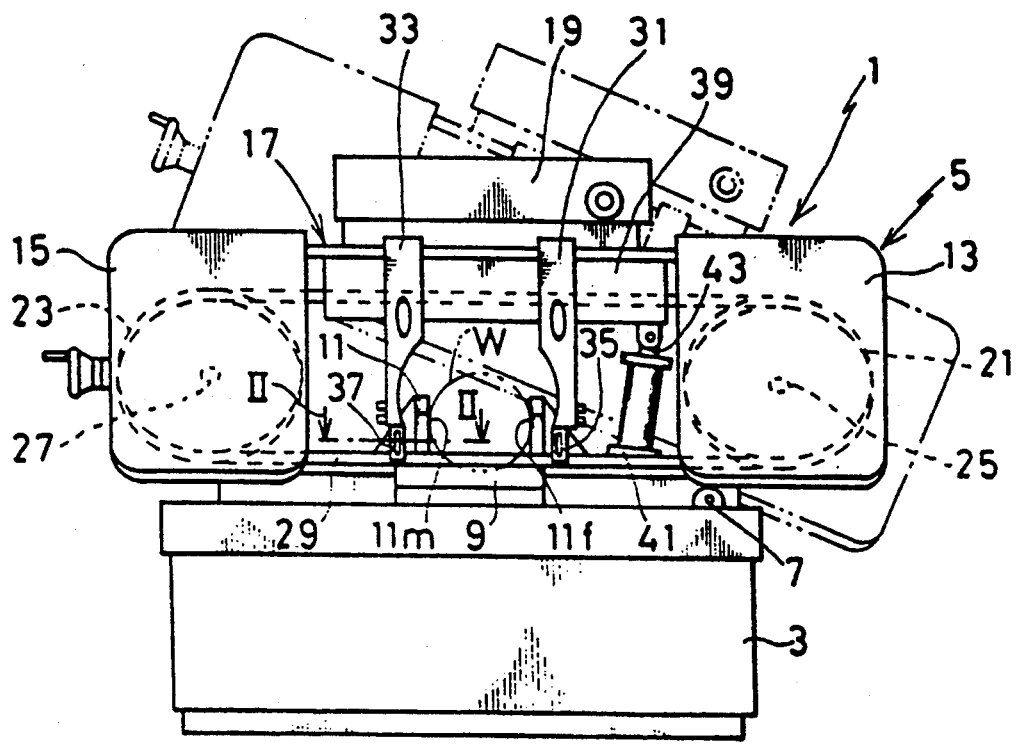
FIG. 1 is a front view of a horizontal bandsaw machine equipped with a first embodiment of the present invention.

Referring now to FIG. 1, a horizontal bandsaw machine 1 which is shown as an example comprises a box-shaped base 3 and a cutting head 5. The cutting head 5 is supported on the base 3 through a hinge pin 7 so that it is free to pivot upon the hinge pin 7, and move up and down.

On top of the base 3 is provided a work table 9 on which a work piece W to be cut can be placed. The work table 9 is provided with a vise device 11 which has a fixed vise jaw 11f and a movable vise jaw 11m to grip the work piece W therebetween.

The cutting head 5 has housing sections 13 and 15 on either side thereof. The tops of the housing sections 13 and 15 are connected by the beam member 17 on which is mounted on a control box 19.

The housing sections 13 and 15 of the cutting head 5 have a drive wheel 21 and a driven wheel 23, which are disposed within the housing sections 13, 15, and mounted on the shafts 25 and 27, respectively. An endless bandsaw blade 29 as a cutting blade is trained around the drive wheel 21 and the driven wheel 23.

Thus, when the drive wheel 21 turns round, the cutting blade 29 is driven to cut the work piece W.

The cutting blade 29 is supported and guided within the cutting area where the work piece W will be cut, such that the tooth tips point vertically downward, by a pair of bandsaw blade guide devices 35 and 37 which are mounted on the lower ends of the fixed guide arm 31 and the movable guide arm 33, respectively.

The fixed guide arm 31 and movable guide arm 33 are mounted on a guide member 39 that is fixed to the beam member 17. The fixed guide arm 31 is mounted fixedly on the guide member 39. The movable guide arm 33 is movably mounted on the guide member 39 so that position thereof can be adjusted to conform to the size of the work piece W.

In addition, between the base 3 and cutting head 5, a raising and lowering cylinder 41 equipped with a piston rod 43 is provided. Therefore, when pressurized oil is forced into the piston side chamber of the raising and lowering cylinder 41, causing the piston rod 43 to extend, the cutting head 5 is raised. Conversely, when pressurized oil is removed from the piston side chamber of the raising and lowering cylinder 41, causing the piston rod 43 to be shortened, the cutting head is lowered by its own weight. Consequently, by installing a suitable control valve in the oil ejection pipe connected to the piston side chamber of the raising and lowering cylinder 41, and by suitably adjusting this control valve, the cutting operation of the work piece w by the cutting blade 29 can be controlled.

Now, let us explain configurations of the bandsaw blade guide devices 35 and 37 provided with embodiments of vibration prevention device of the present invention. The bandsaw blade guide devices 35 and 37, which are attached to the lower ends of the fixed guide arm 31 and the movable guide arm 33, respectively, have basically the same configuration; therefore this explanation will be confined to the bandsaw blade guide device 37 which is attached to the lower end of the movable guide arm 33. Note that the same parts have the same numbers in the explanations of various embodiments which follow.

Figure 3:
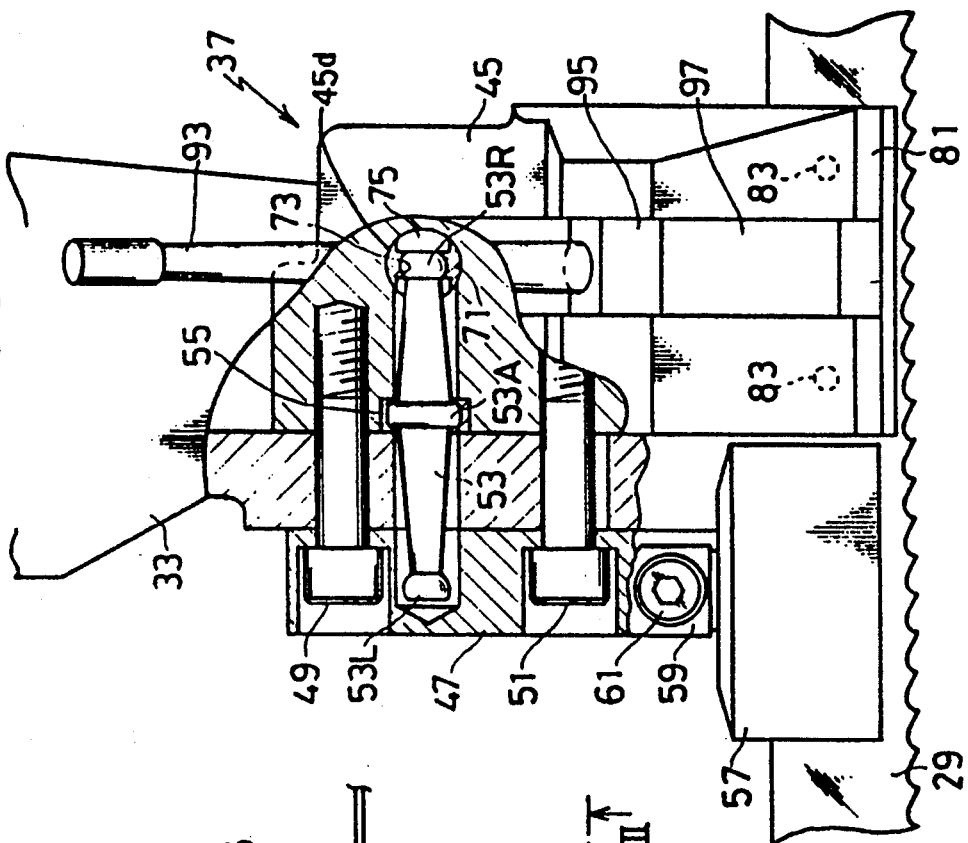
FIG. 3 is a front view, with portions broken away for clarity, of the bandsaw blade guide device provided with the first embodiment of the present invention, the view being taken in the direction of the arrows along the line III—III of FIG. 2.
Figure 2:
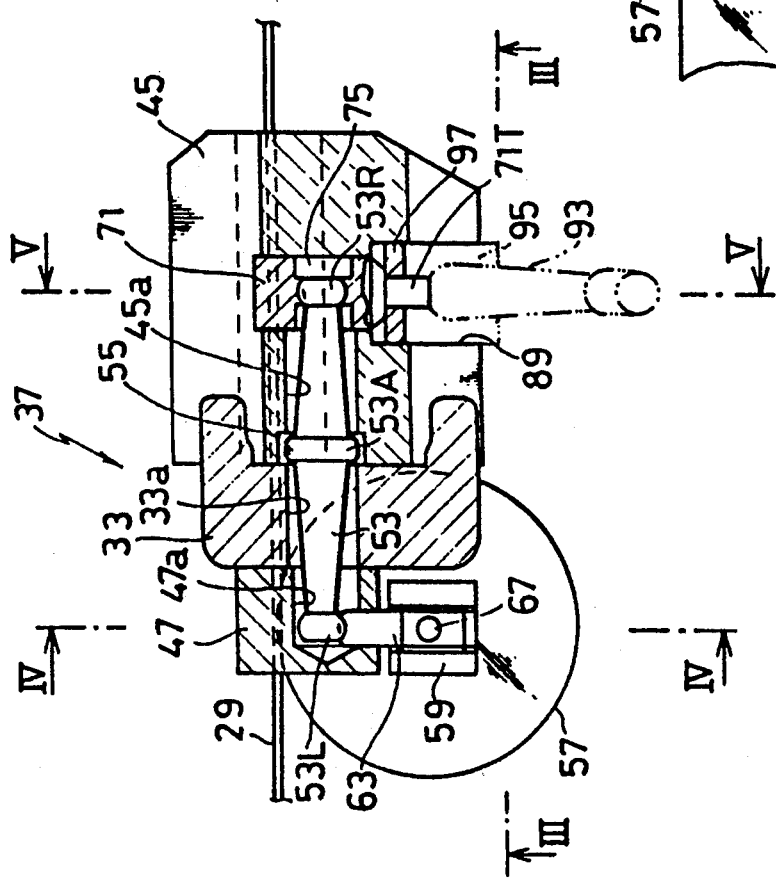
FIG. 2 is a plan view of the bandsaw blade guide device provided with the first embodiment of the present invention, the view being taken in the direction of arrows along line II—II of FIG. 1.

First, the bandsaw blade guide device 37 provided with a first embodiment of the present invention will be explained. As shown in FIG. 2 and FIG. 3, a first holder 45 and a second holder 47 of the bandsaw blade guide device 37 are fixed to lower end of the movable guide arm 33 by means of bolts 49, 51 so that the holders 45, 47 hold a side wall of the movable guide arm 33 therebetween. Moreover, a spherical lever 53 is mounted within the air gap sections 33a, 45a, 47a formed in the movable guide arm 33, the first holder 45 and the second holder 47, respectively, here the air gap sections 33a, 45a, 47a is formed at a position near the bolt 49 between the bolt 49 and bolt 51 in the vertical direction. The spherical lever 53 is supported at the spherical surface 53A by the concave spherical bearing ring 55 mounted within the first holder 45.

Figure 4:
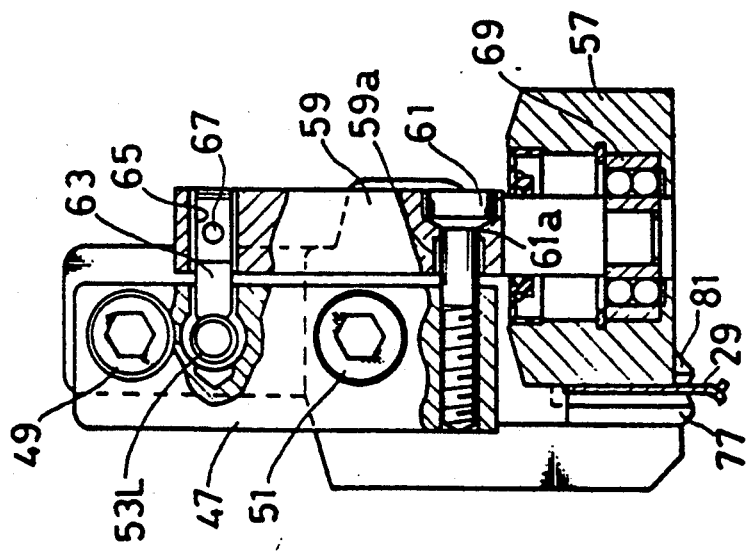
FIG. 4 is a sectional view taken in the direction of arrows along line IV—IV of FIG. 2.

As shown in FIG. 2, FIG. 3 and FIG. 4, a roller shaft 59 is installed in front of the second holder 47, for supporting the first roller 57, as the rolling member. More specifically, the roller shaft 59 is supported at midportion thereof on the second holder 47 by means of a bolt 61 which is threaded in engagement with the second holder 47 through the hole 59a formed in the roller shaft 59; here, as is clear from FIG. 4, the hole 59a is formed so as for the radius thereof to be slightly larger than that of the bolt 61 except neck portion 61a thereof, where the both radii are same, so that the top and bottom ends of the roller shaft 59 are free to pivot right and left in FIG. 4 upon a neck portion 61a of the bolt 61. As shown in FIG. 4, the first roller 57 is supported to the roller shaft 59 through the aligning bearing 69 so that it is automatically aligned and free to rotate.

A set screw 63 is provided on an upper portion of the roller shaft 59, one end thereof being screwed into the screw hole 65 formed in an upper portion of the roller shaft 59. And a tip of another end of the set screw 63 abuts against left spherical end 53L of the spherical lever 53. Thus, a distance between the left spherical end 53L of spherical lever 53 and the upper portion of the roller shaft 59 can be adjusted by rotating the set screw 63. The set screw 63 will be fixed to the roller shaft 59 by the lock screw 67.

Figure 5:
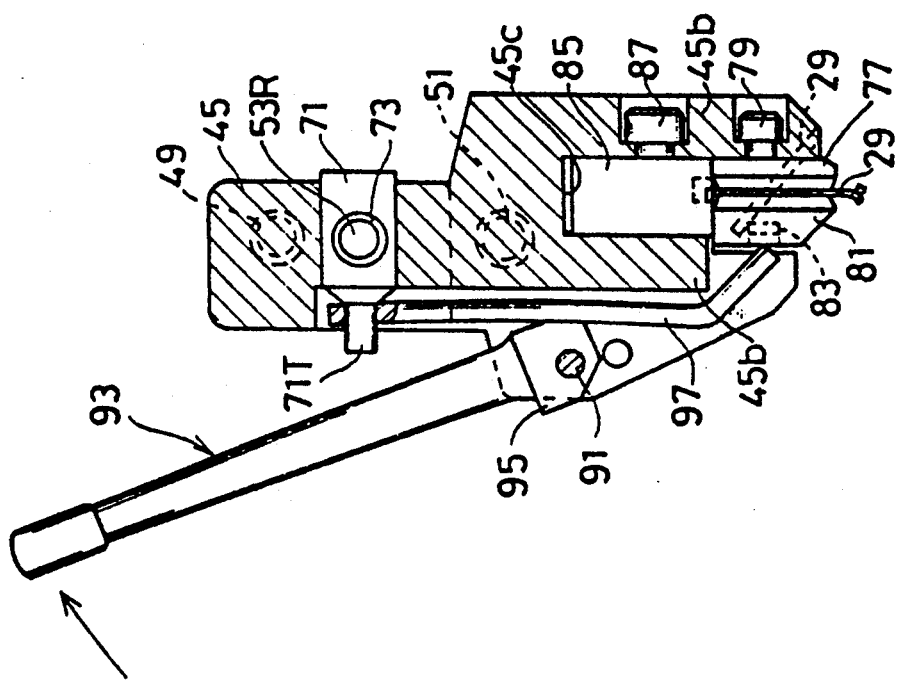
FIG. 5 is a sectional view taken along line V—V of FIG. 2.

As shown particularly, in FIGS. 2 and 5, the first holder 45 has a yoke section 45b at a bottom portion thereof and a vertical groove 89 at a front portion thereof. Within an air gap 45c formed between the yoke section 45b a guide roller 85 for guiding a back surface of the bandsaw blade 29 is mounted, supported by grove 89 so as to be free to rotate.

A fixed guide block 77 is fixed to one of the lower ends of the yoke section 45b of the first holder 45 by means of a bolt 79 to contact one side of the bandsaw blade 29. In addition, a movable guide block 81 is installed on the other lower end of the yoke section 45b to contact to the other side of the bandsaw blade 29; the movable guide block 81 is mounted on the yoke section to be movable in the right and left direction in FIG. 5, by means of horizontal protruding pins 83 that are fixed to the first holder 45. Therefore the movable guide block 81 can hold and guide the bandsaw blade 29 between itself and the fixed guide block 77.

As shown in FIGS. 2 and 5, within the vertical groove 89, a stripe shaped clamp spring 97 is mounted, with a bottom end thereof abutting against the movable guide block 81. And an upper end of the clamp spring 97 is engaged with a protrusion 71T of a freely movable body 71 mounted on an upper portion of the first holder 45. That is to say, on an upper portion of the first holder 45 a horizontal hole 45d to which a right spherical end of the spherical lever 53R extends, is formed. Within the horizontal hole 45d, a freely movable body 71 having a center hole 73 and a protrusion 71T is mounted, with the center hole 73 mating with the right spherical end of the spherical lever 53R. And an upper end of the clamp spring 97 is engaged with the protrusion 71T of the freely movable body 71 mounted on an upper portion of the first holder 45.

A cam member 95 is rotatably mounted within the vertical groove 89 by means of shaft pin 91 to press the center section of the clamp spring 97 rearward. And on the cam member 95 a clamp lever 93 is provided to rotate the cam member 95.

In the above configuration, when the clamp lever 93 is rotated to the position shown by the solid line in FIG. 5, the cam member 95 presses against the center section of the clamp spring 97. Then, the bottom end of the clamp spring 97 and the movable guide block 81 are pressed toward the fixed guide block 77 to hold the bandsaw blade 29 in a vertical orientation as shown by the solid line in FIG. 5.

Meanwhile, as shown in FIG. 2, when the clamp lever 93 is rotated to the above-mentioned position, the upper end of the clamp spring 97 and the freely movable body 71 are pressed rearward, the spherical lever is rotated counterclockwise in FIG. 2, and the set screw 63 mounted on the upper portion of the roller shaft 59 is pressed forward. Thereupon, as is understood from FIG. 4, the upper end of the roller shaft 59 is pressed forward, the roller shaft 59 is rotated clockwise in FIG. 4 around the neck portion of the bolt 61a, and the first roller 57 is pressed backward through an aligning bearing 69 to press strongly and uniformly the bandsaw blade 29.

In addition, as shown in FIG. 5, when the cam member 95 is pressing against the center section of the clamp spring 97, vibration of the band saw 29 will cause the movable guide block 81 to separate from the fixed guide block 77. When this happens, the clamp spring 97 tends to rotate clockwise in FIG. 5 around the point where the cam member 95 presses against it, causing the first roller 57 to press against the bandsaw blade 29 more strongly to suppress the vibrations thereof.

Conversely, when the first roller 57 is pressed to the forward in FIG. 4 due to vibration of the bandsaw blade 29, the force pressing on the movable guide block 81 becomes stronger. Consequently, the movable guide block 81 and the first roller 57 will in cooperation with each other to suppress vibrations of the bandsaw blade 29 effectively. Thus, the noise produced during cutting operation by the bandsaw blade 29, especially medium- and high-frequency noise, can be reduced. The effect is particularly noticeable in cutting of materials that are hard-to-cut and when the bandsaw blade is worn; the present inventors have confirmed that the noise reduction can be as great as 10 to 20 dB.

On the other hand, when the clamp lever 93 is rotated to the clamp open position shown by the two-dot chain line in FIG. 5, the pressure of the cam member 95 on the clamp spring 97 is released, and the reaction force of the bandsaw blade 29 causes the movable guide block 81 to separate from the fixed guide block 77. At the same time, the freely moving body 71 coupled to the clamp spring 97 is no longer pressed rearward and can move forward. Then, through the spherical lever 53, the top end of the roller shaft 59 can move rearward, and its bottom end can move forward to separate from the bandsaw blade 29.

Thus, the bandsaw blade 29 can be attached to or removed from the guide device 37 by one-touch operation of the clamp lever 93, and when the bandsaw blade 29 is attached to the guide device 37, the bandsaw blade 29 is held in a vertical orientation and the vibration thereof is effectively suppressed by the fixed and movable guide blocks 77, 81 and the first roller 57.

Moreover, since there is no member opposite the first roller, the construction is simplified; at the same time, because of the above-mentioned reason, a distance between the movable vise jaw 11m and the bandsaw blade 29 is reduced, so that the excess material on the work piece W can be made as small as possible, and the work piece W can be clamped close to the cutting position to make the clamping secure.

A bandsaw blade guide device 37 provided with a second embodiment of the present invention will now be explained, referring to FIGS. 6 through 9.

As shown in FIGS. 6–9, a first holder 45 of the bandsaw blade guide device 37 is attached on a side wall of the bottom end of the guide arm 33 by means of the two bolts 49 and 51 so that it can be adjusted in the vertical direction, wherein the first holder 45 has a yoke section 45b at a bottom portion thereof.

Figure 8:
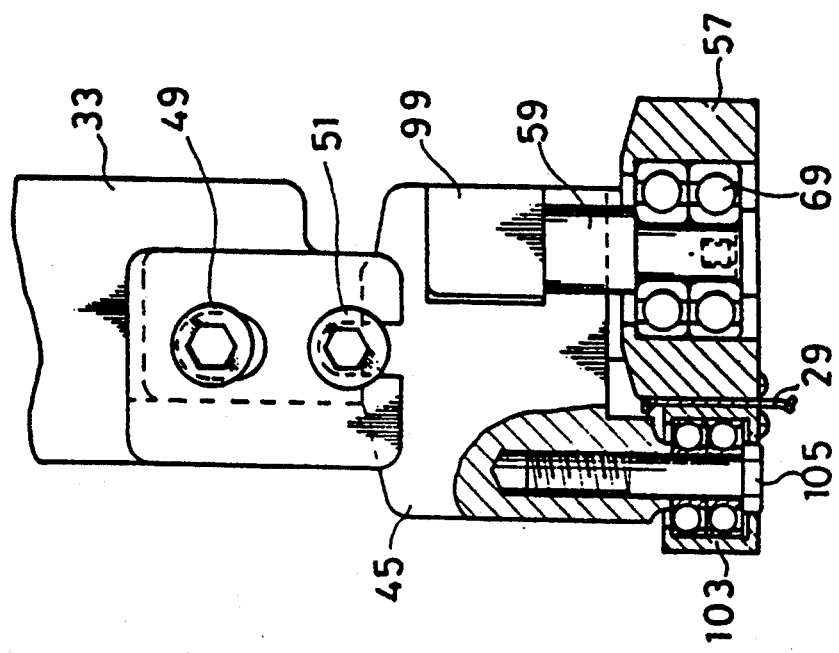
FIG. 8 is a sectional view taken along line VIII—VIII of FIG. 6.

On a front portion of the first holder 45, a L-shaped support block 99 is pivotally supported by a support pin 101. A roller shaft 59 is supported on one end of the L-shaped support block 99. A first roller 57 is attached to a lower end of the roller shaft 59 through the aligning bearing 69 so that it is automatically aligned and free to rotate, as shown in FIG. 8.

A small-diameter second roller 103 is fixed to a rear portion of the first holder 45 through a bearing by a bolt-type shaft 105 so that it faces the first roller 57 across the bandsaw blade 29.

Consequently, the first roller 57 can be moved toward or away from the fixed second roller 103 by pivot of the support block 99 upon the support pin 101.

Figure 9:
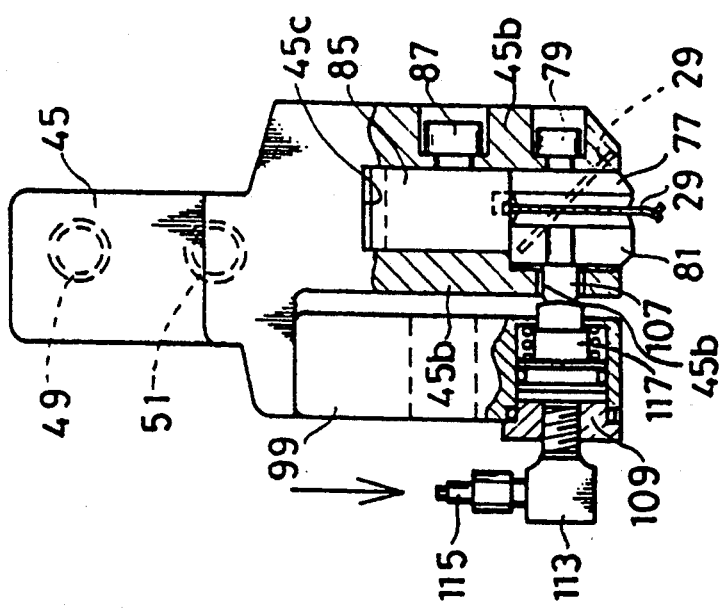
FIG. 9 is a sectional view taken along line IX—IX of FIG. 6.

Now as shown in FIG. 9, a guide foiler 85 is rotatably mounted within an air gap 45c between the yoke section 45b of the first holder 45 by means of a bolt 87, so as to guide the back portion of the bandsaw blade 29. A fixed guide block 77 is fixed to one side of a lower end of the yoke section 45b of the first holder 45 by means of a bolt 79 to contact one side of the bandsaw blade 29. A movable guide block 81 is mounted on the other side of the lower end of the yoke section 45b to contact the other side of the bandsaw blade 29. Specifically the movable guide block 81 is supported by the pin 107 which is mounted on the other side of the lower end of the yoke section so that it is free to move right and left in FIG. 9 with respect to the first holder 45. Therefore, the movable guide block 81 is free to move toward or away from the fixed guide block 77 to hold and release the bandsaw blade 29 between it and the fixed guide block 77.

Figures 6, 7:
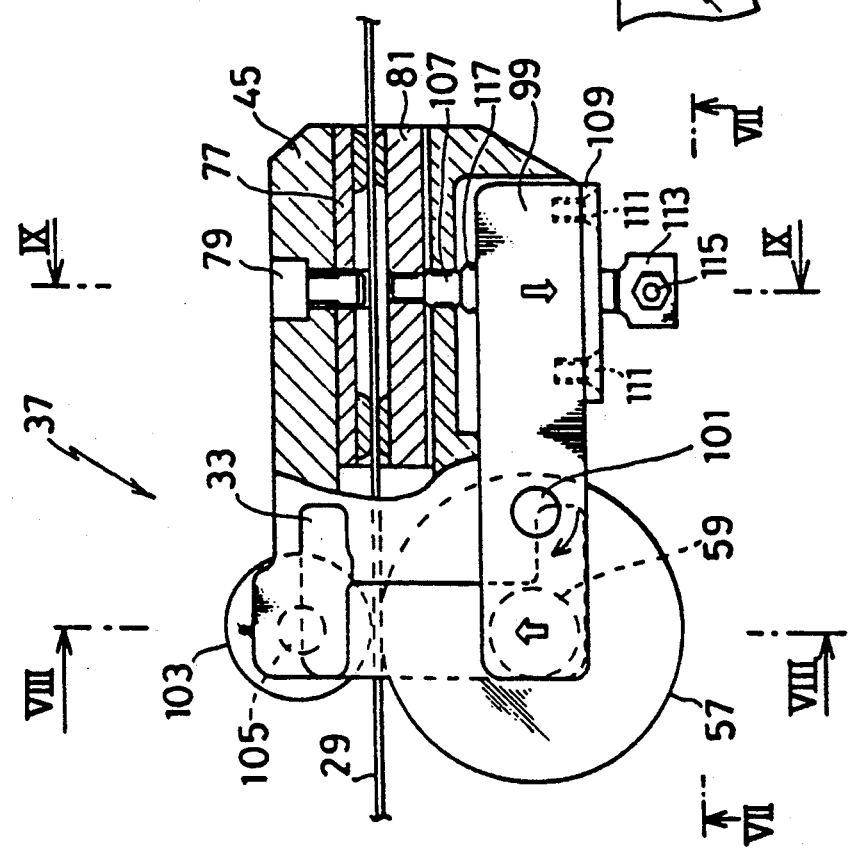
FIG. 6 is a plan view, with portions broken away for clarity, of the bandsaw blade guide device provided with a second embodiment of the present invention.
FIG. 7 is a front view, with portions broken away for clarity, of the bandsaw blade guide device provided with the second embodiment of the present invention, the view being taken in the direction of the arrow along line VII—VII of FIG. 6.

A cylinder, for example a hydraulic cylinder 109, is fastened to a front portion of the support block 99 by means of several bolts 111 shown in FIG. 7. The hydraulic cylinder 109 comprises piston rod 117 which is movable in left and right direction in FIG. 9 and abutting against the pin 107. A pipe 115 is attached to the hydraulic cylinder 109 through a joint 113.

In the configuration described above, by supplying pressurized oil from a hydraulic drive source, which is not shown, to the pipe 115, the piston rod 117 in the hydraulic cylinder 109 is moved rearward (rightward in FIG. 9). Then the piston rod 117 presses the movable guide block 81 against the fixed guide block 77 by means of motion transmitted through the pin 107 to hold the bandsaw blade 29 in a vertical orientation as shown by the solid line in FIG. 9.

Meanwhile, when the piston rod 117 in the hydraulic cylinder 109 moves in the above-mentioned direction, reaction force due to the press action of the hydraulic cylinder 109 causes the support block 99 to pivot clockwise in FIG. 6 upon the support pin 101; and the pivot of the support block 99 causes the first roller 57 to be moved rearward. Thus the bandsaw blade 29 is held strongly between the first roller 57 and the second roller 103.

In addition, when the movable guide block 81 is pressed against the fixed guide block 77, the clamping force on the bandsaw blade 29 can be adjusted by adjusting the oil pressure in the hydraulic cylinder 109. Consequently, even if the bandsaw blade 29 vibrates, the noise generated by vibrations of the bandsaw blade 29 can be effectively suppressed by optimally adjusting the oil pressure.

Also, it is easy for the bandsaw blade 29 to be attached to or removed from the guide device 37, since the bandsaw blade 29 will be simultaneously held between the first and second rollers 57, 103 and between the fixed and movable guide blocks 77, 81, by supplying or removing oil to or from the hydraulic cylinder 109.

In addition, in the second embodiment described above, since the clamping is done by oil pressure, the clamping force is stable and the machine is made up of relatively few parts.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

Moreover, even if the aligning bearing is not used for the first roller 57, a uniform pressure force can be applied to the bandsaw blade 29 since the support block 99 always rotates horizontally and the roller shaft 59 is never tilted.

In the embodiment described above, the sizes of the movable first roller 57 and the fixed second roller 103 may be made the same or even reversed. Or, the fixed second roller 103 may be dispensed with.

A bandsaw blade guide device provided with a third embodiment of the present invention will now be described, based on FIG. 10 through 14.

As is shown in FIGS. 10-13, on a side wall of the lower end of the movable guide arm 33 is attached a first holder 45 by means of the two bolts 49 and 51, so as for the position thereof to be adjustable in the vertical direction, wherein the first holder 45 has a yoke section 45b at a bottom portion thereof and a vertical groove 89 at a front portion thereof.

Figure 10:
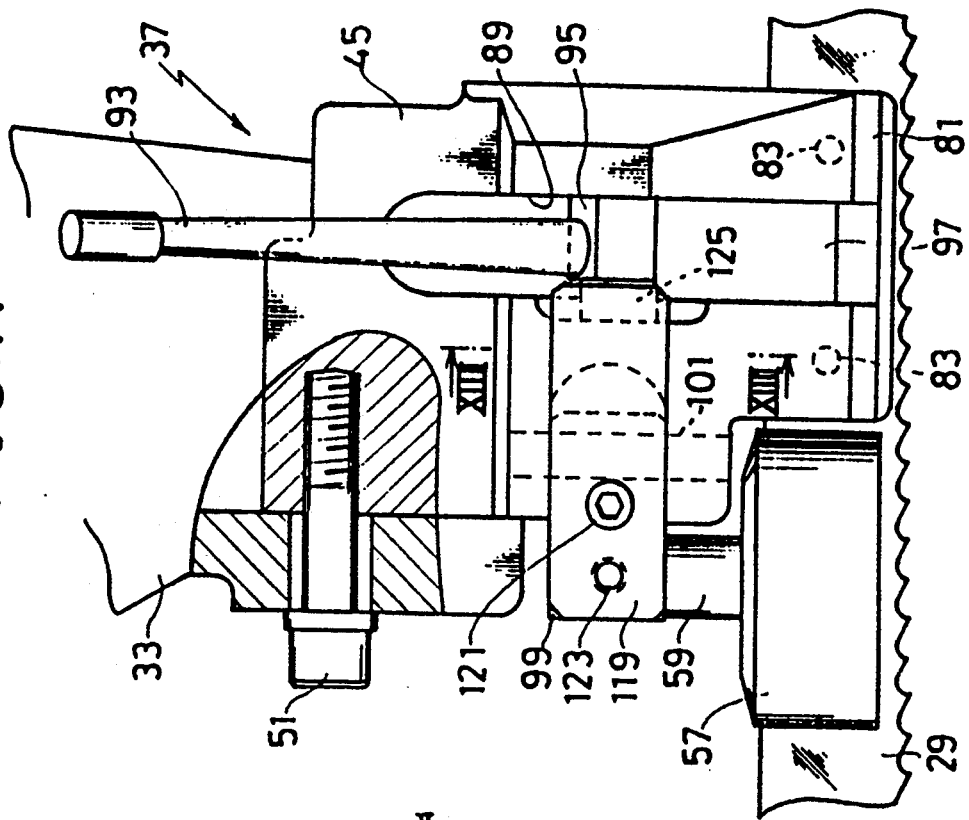
FIG. 10 is a plan view, with portions broken away for clarity, of the bandsaw blade guide device provided with a third embodiment of the present invention.
Figure 11:
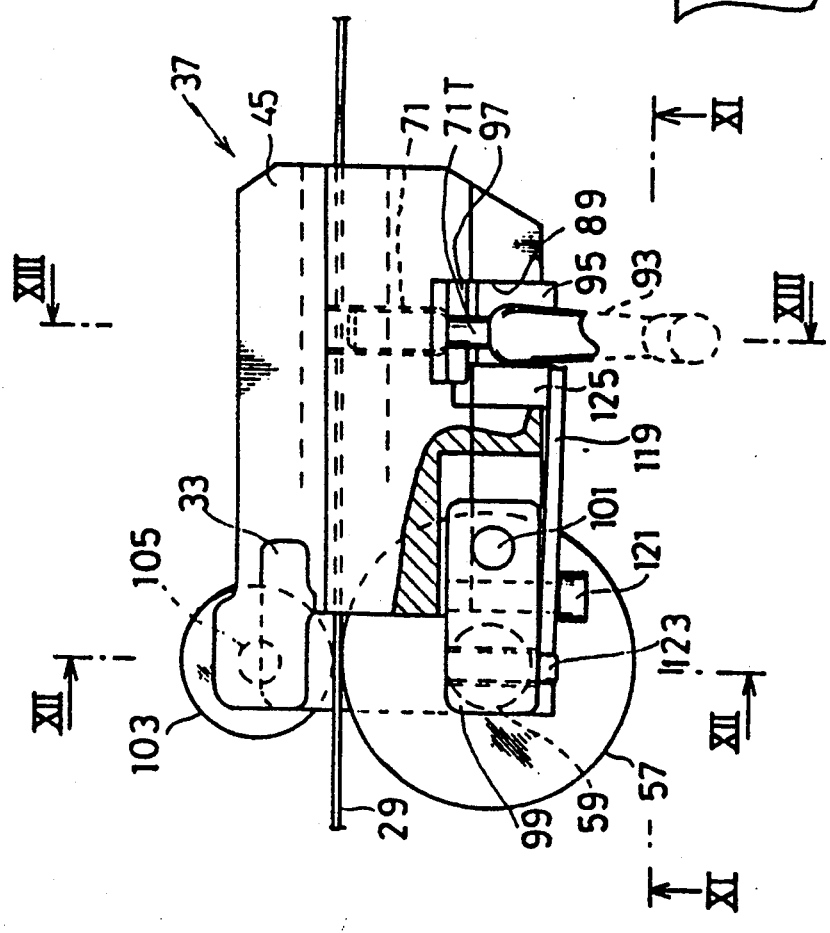
FIG. 11 is a front view, with portions broken away for clarity, of the bandsaw blade guide device provided with the third embodiment of the present invention, the view being taken in the direction of the arrow along line XI—XI of FIG. 10.

As shown particularly in FIGS. 10, 11 and 12, a rectangular support block 99 is pivotally mounted on a front of the first holder 45 by a support pin 101. A plate spring 119 is fixed to a front of the support block 99 at a left end thereof by means of a bolt 123. As shown in FIGS. 10 and 11, a mid-portion of the plate spring 119 is adjustably fixed to the support block 99 by a first adjustment bolt 121. The right end of the plate spring 119 abuts against the cam member 125 which will be discussed below. A roller shaft 59 is attached to one side of the rectangular support block 99. And a first roller 57 is mounted on a bottom portion of the roller shaft 59 through aligning bearing 69 shown in FIG. 12.

A small-diameter second roller 103 is fixed to a rear portion of the first holder 45 by means of a bolt-shaft 105, to face the first roller 57 across the bandsaw blade 29.

Consequently, when the plate spring 119 and the support block 99 pivot upon the support pin 101, the first roller 57 can be moved toward or away from the fixed second roller 103.

As shown in FIG. 13, a guide roller 85 is mounted within the air gap 45c between the yoke section 45b of the first holder 45 by the bolt shaft 87 to guide the back portion of the bandsaw blade 29.

A fixed guide block 77 is fixed to one side of the bottom end of the yoke section 45b of the first holder 45 by the bolt 79 to contact one side surface of the bandsaw blade 29. The movable guide block 81 is installed on the other side of the bottom end of the yoke section 45b to contact the other side surface of the bandsaw blade 29; here the movable block 81 is supported on the first holder 45 by the two horizontally protruding pins 83 so as to be free to move toward or away from the fixed guide block 77.

As is clear from FIGS. 10, 11 and 13, a clamp spring 97 is mounted within the vertical groove 89 of the first holder 45 with the bottom end thereof abutting against the movable guide block 81. Specifically, the clamp spring 97 is supported at the upper portion thereof by a protrusion 71T of a second adjustment bolt 71; the second adjustment bolt is threaded engagement with an upper portion of the first holder 45 and is movable in right and left direction in FIG. 13 by rotation thereof.

Cam members 95 and 125 which are integrated to each other are rotatably mounted within the vertical groove 89 by a shaft pin 91 to press a center section of the clamp spring 97 rearward and the right end of the clamp spring 119 forward, respectively. A clamp lever is mounted on the clamp spring 119. A stopper 127 is installed to limit the clockwise rotation range of the clamp lever 93 in FIGS. 14(A), (B).

Figure 14A:
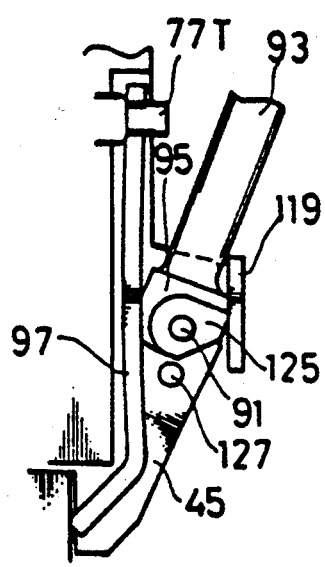
FIG. 14 (A) and (B) are fragmentary sectional view taken along line XIV—XIV of FIG. 11.
Figure 14B:
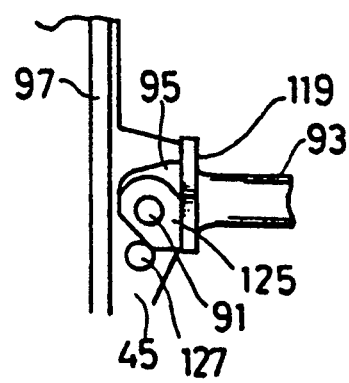
Figure 15:
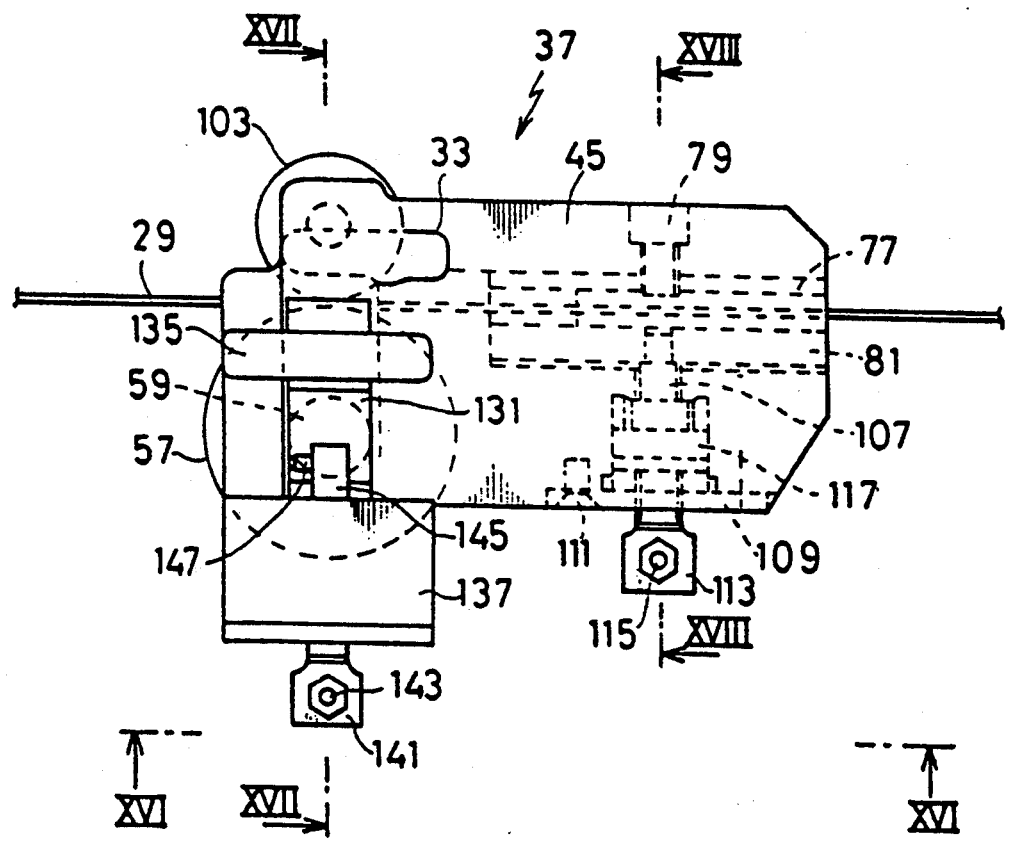
FIG. 15 is a plan view of the bandsaw blade guide device provided with a fourth embodiment of the present invention.
Figure 16:
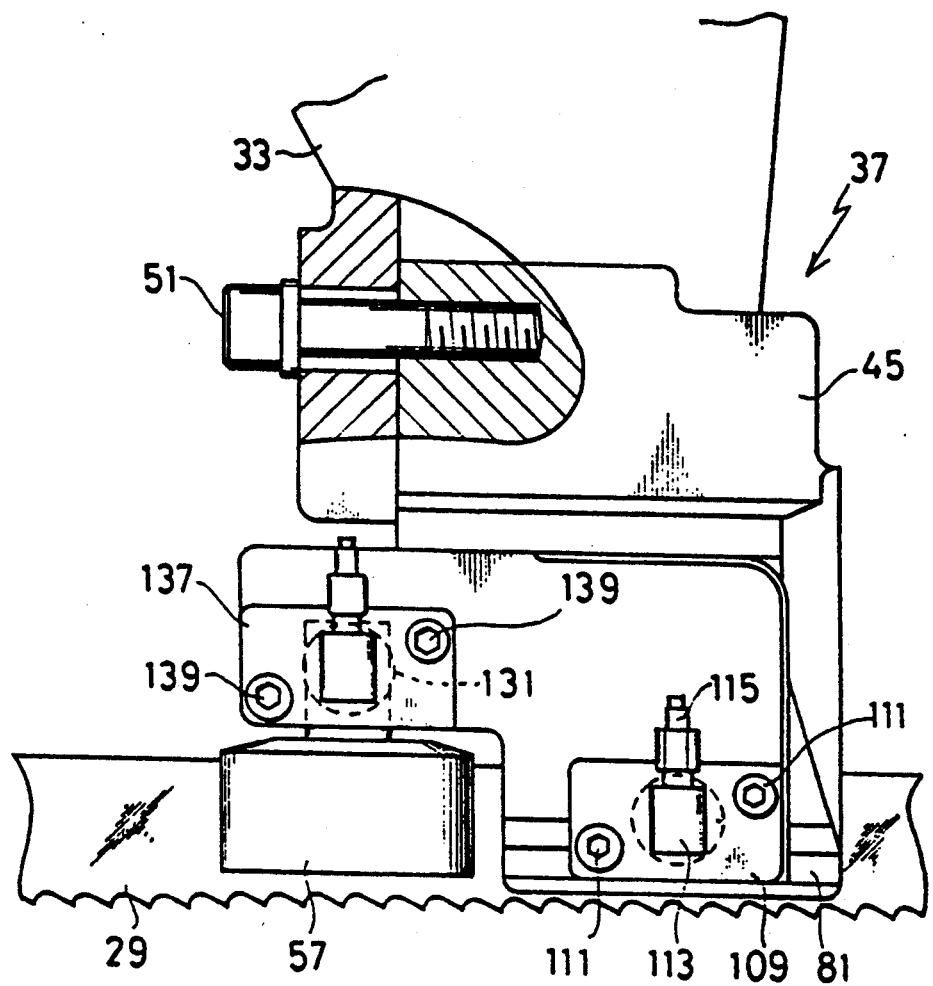
FIG. 16 is a front view, with portions broken away for clarity, of the bandsaw blade guide device provided with the fourth embodiment of the present invention, the view being taken in the direction of the arrow along line XVI—XVI of FIG. 15.

Therefore, when the clamp lever 93 rotates to the position shown by the two-dot long and two short dashes line in FIG. 13, as shown in FIGS. 14(A) and 14(B), the cam member 95 is removed from the clamp spring 97 and the other cam member 125 loosens its pressure on the plate spring 119.

In the configuration described above, when the clamp lever 93 is rotated to the position (FIG. 14 (A)) shown by the solid line in FIG. 13, the cam lever 95 presses against the center section of the clamp spring 97 to push the movable guide block 81 toward the bandsaw blade 29, holding the same in a vertical orientation. Meanwhile, the rotation of the clamp lever 93 causes the other cam member 125 to push the right end of the plate spring 119 forward. Then, the other end of the plate spring 119 causes the support block 99 to rotate clockwise in FIG. 10 upon the support pin 101 and the first roller 57 is pushed backward to push the bandsaw blade 29 strongly against the second roller 103.

When the clamp lever 93 is rotated to the position shown by the two-dot long and two short line in FIG. 13, the pressure of the cam member 95 against the clamp spring 97 is released. Then the reaction force of the bandsaw blade 29 causes the movable guide block 81 to separate from the fixed guide block 77. In addition, the rotation of the clamp lever 93 releases the pressure of the other cam member 125 against the plate spring 119, and the first roller 57 separates from the bandsaw blade 29.

Thus, the bandsaw blade 29 can be attached to or removed from the guide device 37 by one-touch operation of the clamp lever 93, and when the bandsaw blade 29 is attached to the guide device 37, the bandsaw blade 29 is held in a vertical orientation and the vibration thereof is effectively suppressed by the fixed and movable guide blocks 77, 81 and the first and second rollers 57, 103.

Moreover, by rotating the adjustment bolts 71 and 121 suitably, force produced by the guide blocks 77, 81 to hold the bandsaw blade 29 in a vertical orientation, and force produced by the rollers 57, 103 to suppress vibrations of the bandsaw blade can be set independently of each other, permitting both functions to be optimized.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

The relative sizes of the first roller 57 and the second roller 103 may be opposite to what they were in the above explanation.

A bandsaw blade guide device provided with a fourth embodiment of the present invention will now be explained referring to FIGS. 15 through 18.

Figure 18:
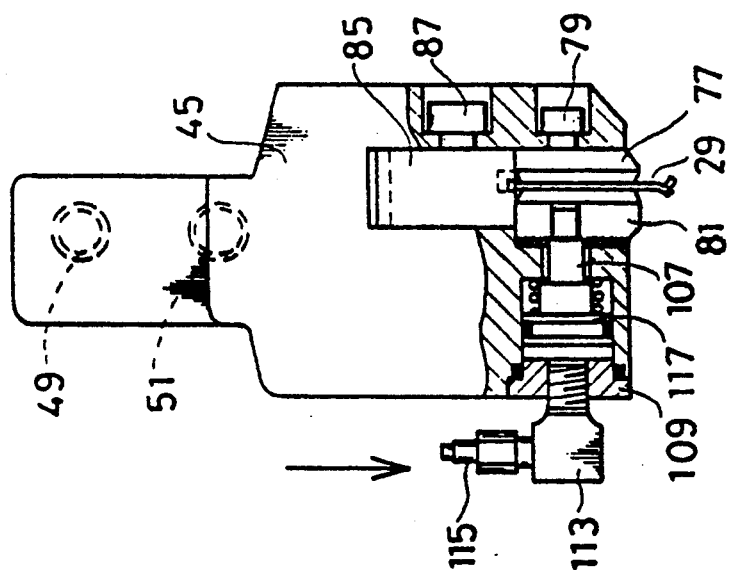
FIG. 18 is a sectional view taken along line XVIII—XVIII of FIG. 15.

The bandsaw blade guide device provided with the fourth embodiment is similar to that provided with the second embodiment shown in FIGS. 6–9, in the mechanism to hold the bandsaw blade in a vertical orientation; i.e. as shown particularly in FIG. 18 on the first holder 45, in order to guide a back portion of the bandsaw blade 29 a guide roller 85 is mounted, and in order to hold the bandsaw blade 29 in a vertical orientation a fixed guide block 77, a movable guide block 81, a pin 107, hydraulic cylinder 109 having piston rod 117, a joint 113 and a pipe 115 are mounted.

However, it is different from the guide device provided with the second embodiment in the mechanism to prevent the vibration of the bandsaw blade 29. That is to say, as shown particularly in FIG. 17, a horizontal hole 129 is formed within a center portion of the first holder 45. A sliding piece 131 formed with a slot 133 is inserted into the hole 129 so that it is freely slidable in the right and left direction in FIG. 17. A pin 135 fixed to the first holder 45 is inserted through the slot 133, so that the movement of the sliding piece 135 is limited by the pin 135. A roller shaft 59 is integrated with the bottom portion of the sliding piece 131. A first roller 57 is mounted on the roller shaft through aligning bearing 69.

Figure 17:
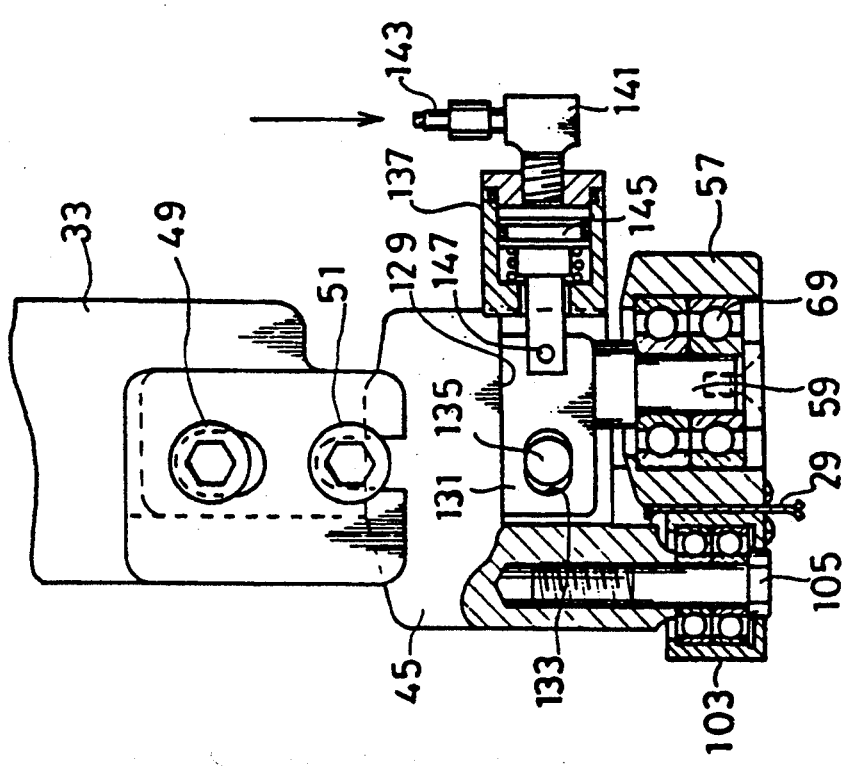
FIG. 17 is a sectional view taken along line XVII—XVII of FIG. 15.

In addition, a hydraulic cylinder 137 for moving the sliding piece 131, is attached to the first holder 45 by means of a plurality of bolts 139 (see FIG. 16); that is to say, a piston rod 145 is installed inside the hydraulic cylinder 137 so that it is free to move right and left in FIG. 17, and one end of the piston rod 145 is coupled to the sliding piece 131 by a pin 147. To the hydraulic cylinder 137, a pipe 143 for supplying a pressurized oil is attached through a joint 141.

In the configuration described above, when pressurized oil is supplied from a hydraulic drive source, which is not shown in the figures, to the pipe 143, the piston rod 145 in the hydraulic cylinder 137 moves rearward (leftward in FIG. 17). Then, the roller shaft 59 and the first roller 57 integrated with the sliding piece 131 is moved rearward to strongly push the bandsaw blade 29 against the fixed second roller 103.

Similarly, as to the mechanism for holding the bandsaw blade 29 in the vertical orientation which is particularly shown in FIG. 18, when pressurized oil is supplied from the hydraulic drive source, which is not shown, to the pipe 115 of the hydraulic cylinder 109, the piston rod 117 inside the hydraulic cylinder 109 is driven rearward (rightward in FIG. 18). Then the moving guide block 81 is pushed through the pin 107 against the fixed guide block 77 to hold the bandsaw blade 29 in a vertical orientation.

Consequently, if the same supply valve is used to control the pressurized oil to supply to the pipe 115 and the pipe 143, the moving guide block 81 and the first roller 57 will set at the same time, so that the bandsaw blade 29 will be held in a vertical orientation and vibrations suppressed at the same time.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

In the embodiment discussed above the relative sizes of the movable first roller 57 and the fixed second roller 103 may be reversed, or they may be the same size. Also it is possible to dispense with the fixed second roller 103.

In the above embodiment, hydraulic cylinders 109 and 137 are provided as first and second pressure applying devices, respectively. It should be understood, however, that a clamp lever 93 as shown in the preceding embodiments can be employed in place of these hydraulic cylinders 109 and 137.

Figure 19:
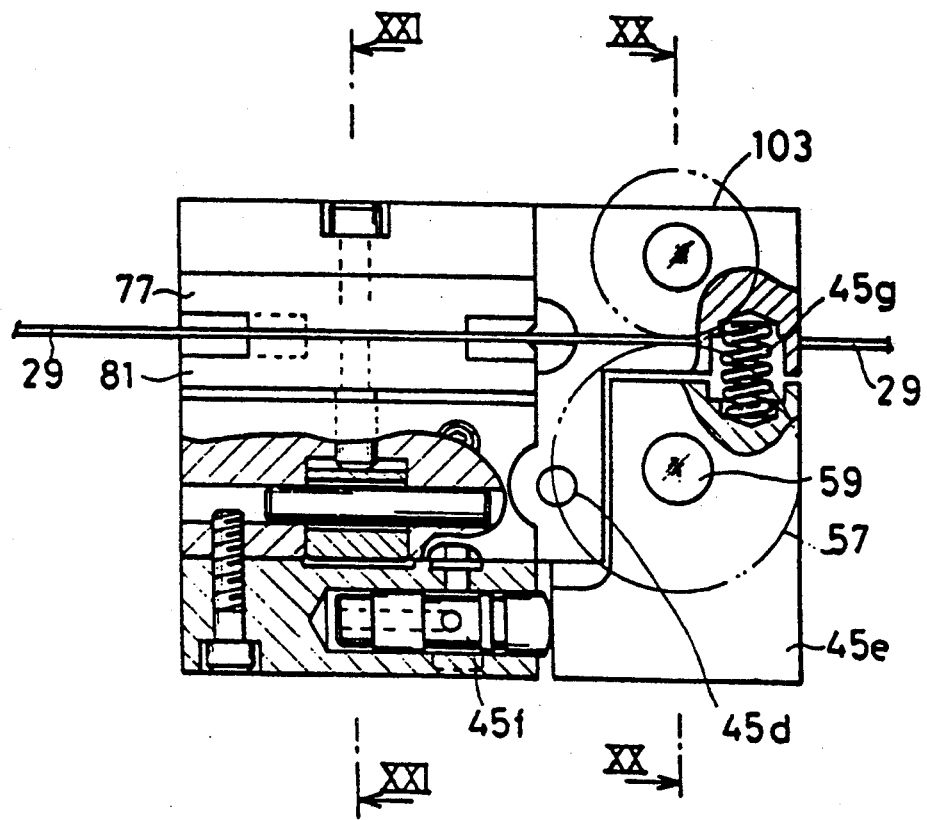
FIG. 19 is a plan sectional view, with portions broken away for clarity, of the bandsaw blade guide device provided with fifth embodiment of the present invention.
Figure 20:
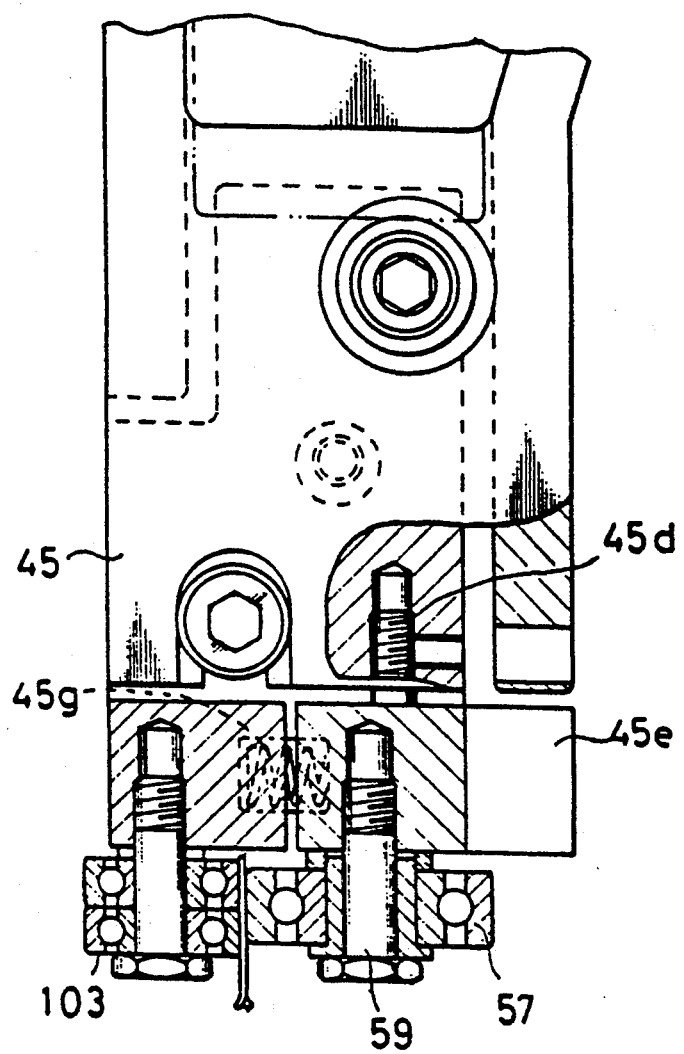
FIG. 20 is a sectional view taken along line XX—XX of FIG. 19.
Figure 21:
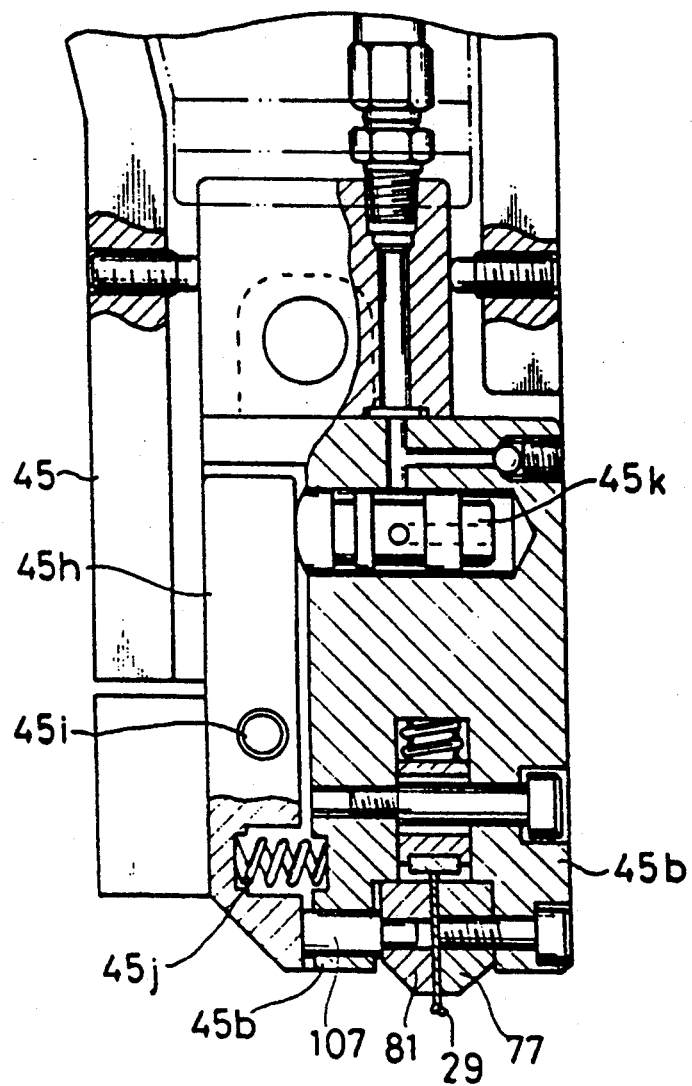
FIG. 21 is a sectional view taken along line XXI—XXI of FIG. 19.

Let us now explain a bandsaw blade guide device 37 provided with a fifth embodiment, referring to FIGS. 19 through 21.

As shown in FIGS. 19-21, the bandsaw blade guide device provided with the fifth embodiment is similar to that provided with the fourth embodiment explained above. The guide device provided with the fifth embodiment is different from that provided with the fourth embodiment, in that in the former, the pressure forces from hydraulic cylinders are transmitted to the movable guide block and the movable first roller through levers.

That is to say, as shown particularly in FIGS. 19, 20, a shaft 45d is installed on a bottom portion the first holder 45. A first lever member 45e is rotatably supported on the shaft 45d. A roller shaft 59 for supporting a first roller 57 is mounted on the lever member 45e. A spring 45g is elastically mounted between the lever member 45e and the first holder 45. Therefore, the lever member 45e is biased and caused to rotate clockwise in FIG. 19 upon the shaft 45d. A hydraulic cylinder 45f is mounted on the front of the first holder 45 in order to rotate the lever member 45e in the counterclockwise direction in FIG. 19 and cause the first roller to move toward the bandsaw blade 29.

In addition, a second roller 103 is mounted on a rear portion of the first holder 45 to face the first roller 57 across the bandsaw blade 29.

Consequently, by supplying pressurized oil from a hydraulic driving source, which is not shown, to the hydraulic cylinder 45f, the lever member 45e rotates clockwise in FIG. 19. And the first roller 57 approaches the second roller 103 through the bandsaw blade 29, so that the bandsaw blade 29 is held between the first roller 57 and the second roller 103.

When the pressurized oil is removed from the hydraulic cylinder 45f, the elastic force of the spring 45g causes the lever member 45e to be rotated counterclockwise in FIG. 19, so that the first roller 57 is removed from the bandsaw blade 29 and the second roller 103, releasing the bandsaw blade 29 from the holding.

Meanwhile, as shown in FIG. 21, a fixed guide block 77 and a movable guide block 81 are mounted on a yoke section of the first holder 45 to hold the bandsaw blade 29 in a vertical orientation. A pin 107 is mounted on one end of the yoke section to press the movable guide block 81 toward the bandsaw blade 29. A lever member 45h is pivotally mounted on a front portion of the first holder 45 by means of a shaft 45i, with a bottom end the shaft 45i abutting a front end of the pin 107. A spring 45j is mounted between bottom end of the lever member 45h and that of the first holder 45 to bias and cause the lever member 45h to be rotated clockwise in FIG. 21 upon the shaft 45i.

In addition, a hydraulic cylinder 45k is mounted on the upper portion of the first holder 45 with a piston thereof abutting against an upper end of the lever member 45h, in order to rotate the lever member 45h counterclockwise in FIG. 21 upon the shaft 45i.

Consequently, by supplying pressurized oil from a hydraulic driving source, not shown in the figures, to the hydraulic cylinder 45k, the lever member 45h is rotated counterclockwise in FIG. 21 upon the shaft 45i to move the pin 107 and the movable guide block 81 toward the bandsaw blade 29 and the fixed guide block 77, holding the bandsaw blade 29 in a vertical orientation between the movable guide block 81 and the fixed guide block 77.

When pressurized oil is removed from the hydraulic cylinder 45k, the elastic force of the spring 45j causes the lever member 45h to be rotated clockwise in FIG. 21 upon the shaft 45i, separating the movable guide block 81 from the bandsaw blade 29 and the fixed guide block 77, releasing the bandsaw blade 29 from the holding.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

Now let us explain a bandsaw blade guide device 37 provided with a sixth embodiment of the present invention, referring to FIGS. 22 through 25.

Figure 23:
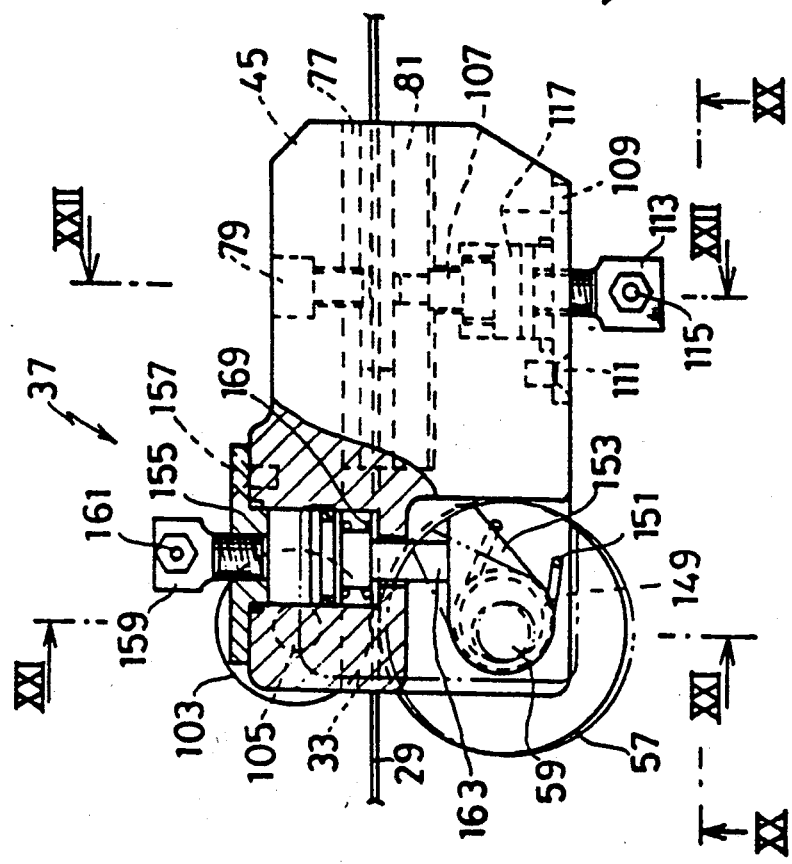
FIG. 23 is a front view, with portions broken away for clarity, of the bandsaw blade guide device provided with the sixth embodiment of the present invention, the view being taken in the direction of the arrow along line XXIII—XXIII of FIG. 22.
Figure 25:
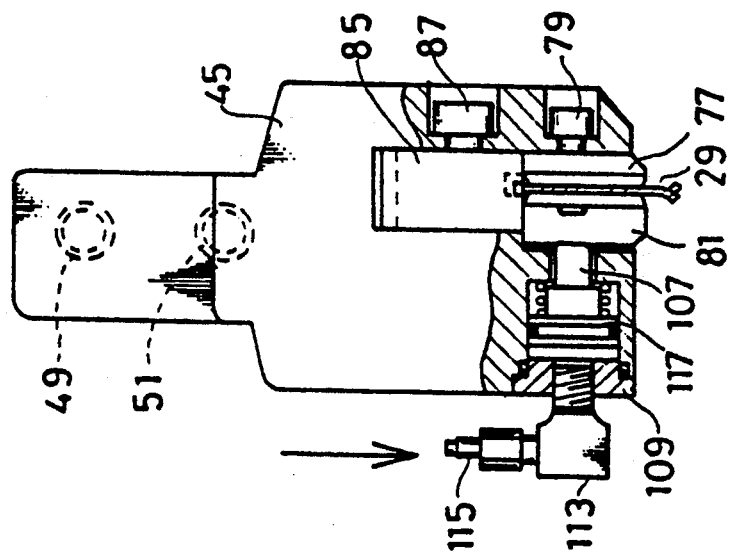
FIG. 25 is a sectional view taken along line XXV—XXV of FIG. 22.

As shown particularly in FIGS. 23 and 25, the mechanism for holding the bandsaw blade 29 in a vertical orientation has a configuration similar to those for the bandsaw blade guide device having the second and fourth embodiments of the present invention described above. That is to say, when pressurized oil is supplied from a hydraulic driving source, which is not shown, to a pipe 115, a piston rod 117 in a hydraulic cylinder 109 moves rearward (rightward in FIG. 25). Then, a moving guide block 81 is pushed through a pin 107 against the fixed guide block 77 to hold the bandsaw blade 29 in a vertical orientation between the movable and the fixed guide blocks 81, 77.

On the other hand, a mechanism for suppressing the vibration of the bandsaw blade 29 is as follows.

Figure 22:
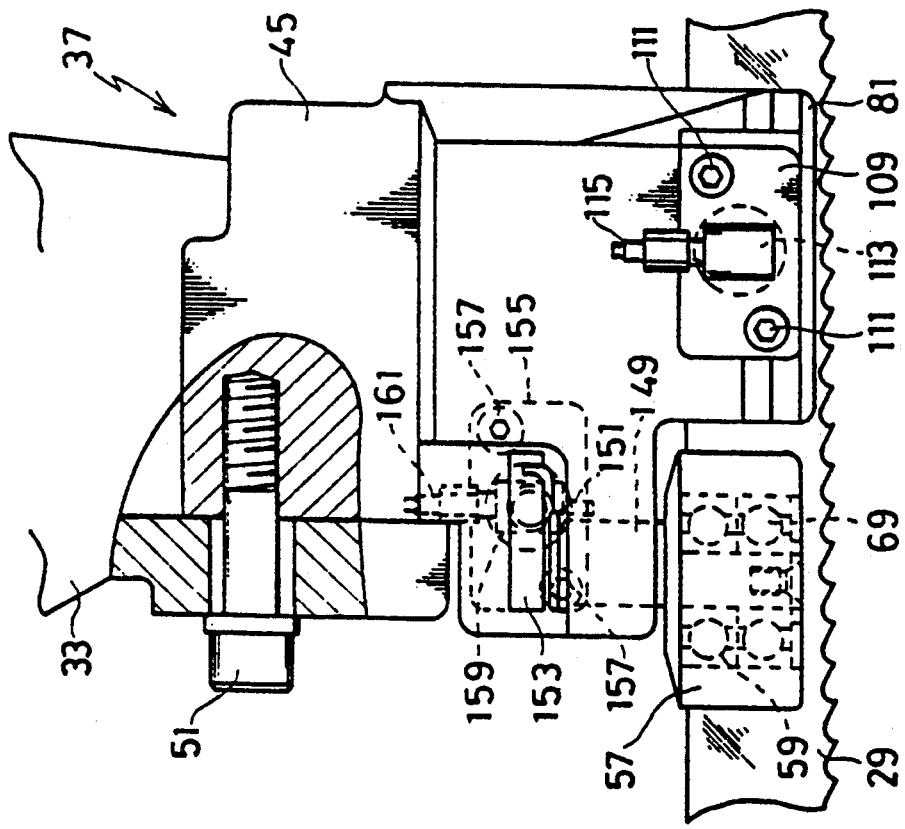
FIG. 22 is the bandsaw blade guide device provided with a plan view, with portions broken away for clarity, of a sixth embodiment of the present invention.
Figure 24:
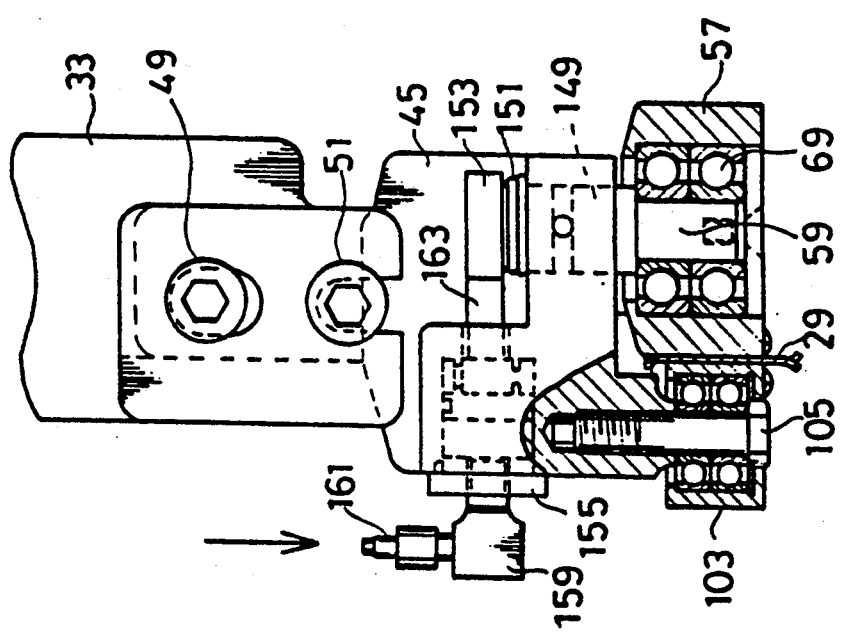
FIG. 24 is a sectional view taken along line XXIV—XXIV of FIG. 22.

As shown particularly in FIGS. 22 and 24, a shaft 149 is rotatably mounted on a left portion of a front of the first holder 45. And a roller shaft 59 is supported at an off-center position of the shaft 149. On the roller shaft 59, a first roller 57 is mounted through an aligning bearing 69. A second roller 103 is mounted on a left portion of a rear of the first holder 45 through a shaft 105 to face the first roller 57 across the bandsaw blade 29. Therefore, by rotating the shaft 149 the first roller 57 is moved toward and away from the bandsaw blade 29 and the second roller 103.

A cam member 153 is attached to the shaft 149 through a return spring 151, so that the return spring 151 biases and causes the cam member 153 and the shaft 149 to rotate upon the axis of the shaft 149. A hydraulic cylinder 155 having a piston rod 163 that is free to move back and forth, is mounted on a rear portion, which is above the second roller 103, of the first holder by means of a plurality of bolts 157, so that one end of the piston rod 163 abuts against the cam member 153. A pipe 161 is attached to the hydraulic cylinder 155 through a joint 159.

In the configuration described above, when pressurized oil is supplied from a hydraulic drive source, which is not shown, to the pipe 161, the piston rod 163 in the hydraulic cylinder 155 moves forward (downward in FIG. 22). The motion of the piston rod 163 acts on the shaft 149 through the cam member 153, causing it to rotate clockwise in FIG. 22. When the shaft 149 rotates, the first roller 57 which is at the off-center position of the shaft 149 moves backward, pushing the bandsaw blade 29 strongly against the fixed second roller 103 to suppress the vibration of the bandsaw blade 29.

When pressurized oil is removed from the pipe 161, the action of the return spring 151 causes the piston rod 163 and the cam member 153 to return to their original positions, and the shaft 149 rotates counterclockwise in FIG. 22 causing the first roller 57 to move forward (downward in FIG. 22), returning to its original position.

Also, by using the same supply valve to control the supply of pressurized oil to the pipe 115 and the pipe 161, the moving guide block 81 and the first roller 57 can be made to act at the same time, so that the bandsaw blade 29 is easily attached to and removed from the guide device 37; moreover a ratio of the pressure on the movable guide block 81 to hold the bandsaw blade 29 in the vertical orientation and the pressure on the first roller to suppress vibration of the bandsaw blade 29, is most suitably adjusted.

In the configuration described above, it is possible to dispense with the return spring 151; in this case the piston rod 163 may be engaged with the cam 153, and a return spring 169, shown in FIG. 22, may be disposed within the hydraulic cylinder 155. In addition the rotation of the eccentric shaft 149 could be driven by some means other than pressurized oil, such as a spring.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

Also, the relative sizes of the movable first roller 57 and the fixed second roller 103 can be reversed, or they can be the same size. Further, it is possible to dispense with the fixed second roller 103.

Figure 26:
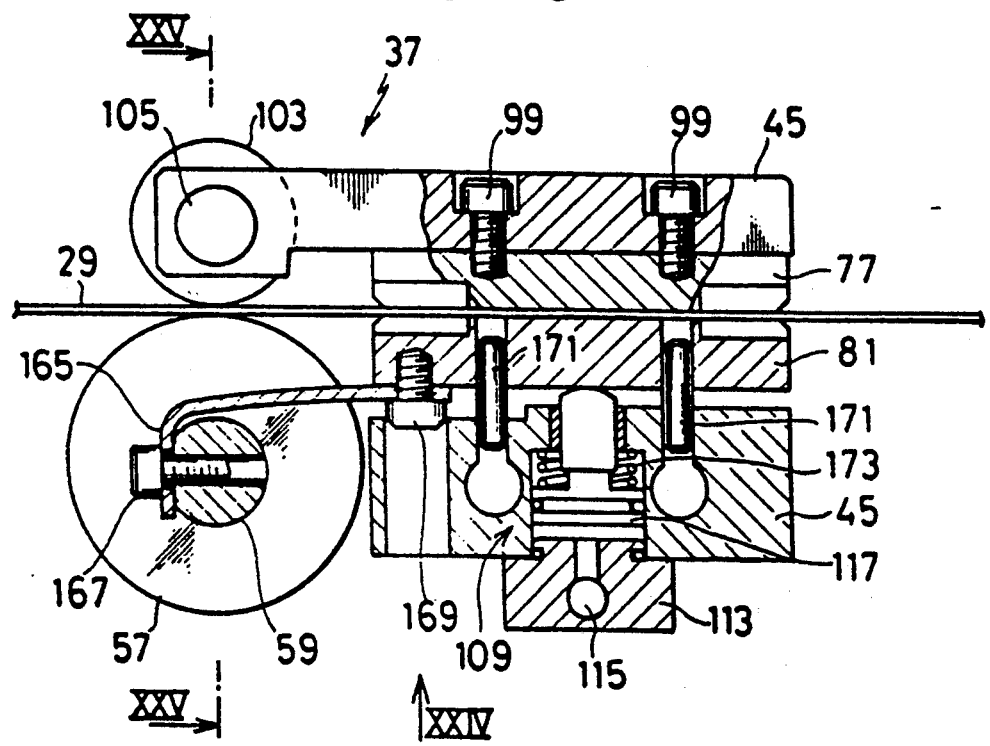
FIG. 26 is a plan view, with portions broken away for clarity, of the bandsaw blade guide device provided with a seventh embodiment of the present invention.
Figure 27:
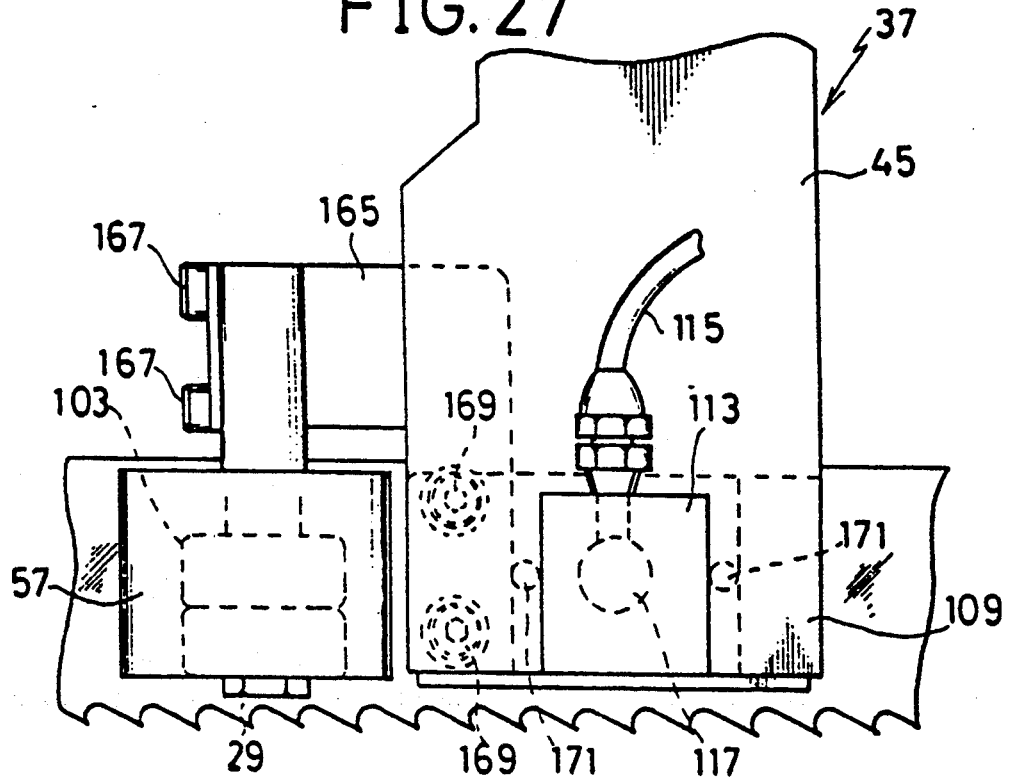
FIG. 27 is a front view of the bandsaw blade guide device provided with the seventh embodiment of the present invention, the view being taken in the direction of the arrow along line XXVII—XXVII of FIG. 26.

Now let us explain a bandsaw blade guide device 37 provided with a seventh embodiment of the present invention, referring to FIGS. 26 through 28.

As shown in FIGS. 26, 27, and 28, there is provided at a bottom portion of the first holder 45, a yoke section 45b which is similar to that of FIGS. 5, 9, 13, 19, 21, 25, is formed. A fixed guide block 77 is mounted on one side of the yoke section of the first holder 45b. A movable guide block 81 is mounted on the other side of the yoke section of the first holder 45b by a plurality of guide pins 171, so as freely to move back and forth. On a left side portion of the movable guide block 81, a plate spring 165 is mounted by a plurality of bolts 169. And a roller shaft 59 is supported at a tip of the plate spring 165 by a plurality bolts 167. A first roller 57 is mounted on the roller shaft 57 through an aligning bearing 69. Also a second roller 103 is mounted on a left side portion of the one side of the yoke section of the first holder 45b by a shaft 105, facing the first roller 57 across the bandsaw blade 29.

As can be seen from FIGS. 26 and 27, a hydraulic cylinder 109 provided with piston rod 117 through a return spring 173, is mounted on the other side of the yoke section of the first holder 45b so that the piston rod 117 abuts against the movable guide block 81.

In the configuration described above, by supplying pressurized oil from a hydraulic drive source, which is not shown to the pipe 115, the piston rod 117 in the hydraulic cylinder 109 overcomes the force of the spring 173 to move rearward (upward in FIG. 26) and push both the movable guide block 81 and the first roller 57 rearward. Here, firstly, the first roller 57 contacts the bandsaw blade 29, and then the plate spring 165 deforms until the movable guide block 81 contacts the bandsaw blade 29, pushing the first roller 57 against the bandsaw blade 29. This action holds the bandsaw blade 29 in a vertical orientation and also suppresses vibrations thereof.

By removing the pressurized oil, the return force of the spring 173 pushes the piston rod 117 forward (downward in FIG. 26), and the first roller 57 and the movable guide block 81 return forward to their original positions.

Although the second roller 103 is used for a supporting member facing the first roller 57 across the bandsaw blade 29, for supporting the bandsaw blade 29 between itself and the first roller, alternatively, a supporting block similar to the fixed guide block 77 may be used for the supporting member.

Now let us explain a bandsaw blade guide device 37 provided with a eighth embodiment of the present invention, referring to FIG. 29.

The bandsaw blade guide device provided with the eighth embodiment has almost the same configuration as that provided with seventh embodiment, but, as shown in FIG. 29, a right end of the plate spring 165 is not fixed to a movable guide block 81 by the bolts 169 in the guide device provided with the eighth embodiment, instead, the plate spring 165 is attached to the movable guide block 81 by a plurality of guide pins 171. Thus, in the present guide device, the movement of the piston rod 117 presses the movable guide block 81 rearward through the plate spring 165.

Other than this change, the configuration is basically the same as that with the seventh embodiment.

In the configuration described above, since the piston rod 117 pushes against the movable guide block 81 near the middle of the block, even if the first roller 57 is broken the bandsaw blade 29 will be held firmly in place.

Also, the pressure forces of the first roller 57 and the movable guide block 81 can be set to optimum values by adjusting the pressure of the oil supplied to the hydraulic cylinder 113 and varying the bending strength of the plate spring 165 within the horizontal plane.

Figure 30:
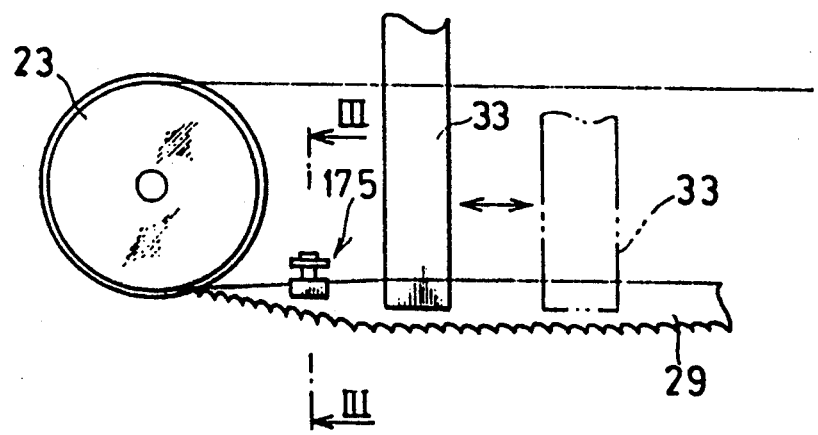
FIG. 30 is a front view of the bandsaw blade guide device provided with a ninth embodiment of the present invention.
Figure 31:
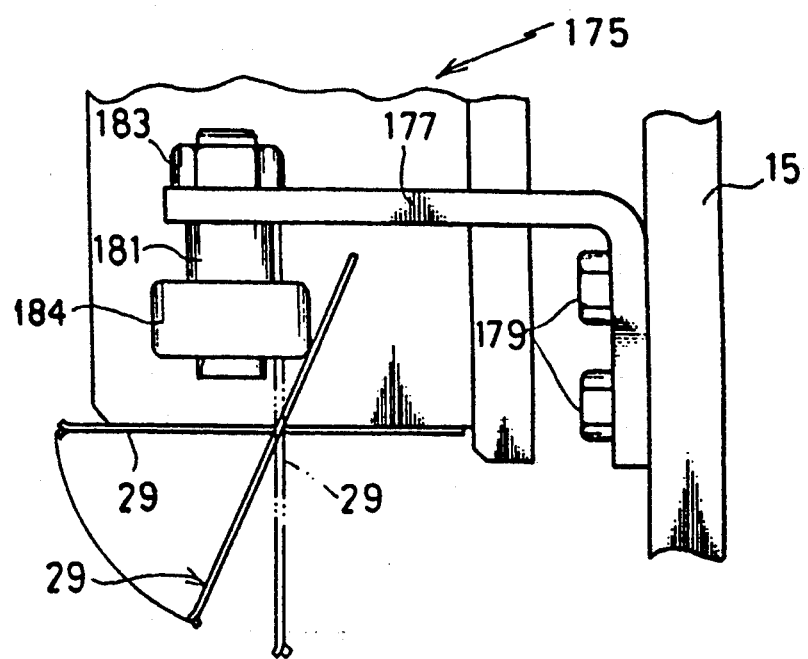
FIG. 31 is a sectional view taken along line XXXI—XXXI of FIG. 30.

Let us now explain a ninth embodiment of the present invention, referring to FIGS. 30 and 31.

As shown in FIG. 30 and FIG. 31, a movable guide arm 33 which will hold the bandsaw blade 29 to twist the same by 90° while guiding it, is attached to the guide member 39 of the cutting head 1, both guide member 39 and cutting head 1 being shown in FIG. 1. A vibration prevention device 175 is attached, for example, to the housing 15 for enclosing the driven wheel 23, both of which are shown in FIG. 1.

Explaining the vibration prevention device 175 in more detail, the L-shaped support bracket 177 in the vibration prevention device 175 is attached to the housing 15 by a plurality of bolts 179 so that it is installed between the driven wheel 23 and the movable guide arm 33; preferably it is installed at about a mid-portion of the driven wheel 23 and the movable guide arm 33 to effectively suppress the vibration of the bandsaw blade 29. A shaft 181 is attached to a tip of the support bracket 177 by a nut 183. A roller 184 is freely rotatably supported on the shaft 181 so as to push the bandsaw blade with a predetermined strong force; a strength of the force depends on the radius of the roller 184, but it is preferably larger than 10% of that for twisting in the guide arms and more preferably between 40% and 100% of the same.

In the configuration described above, the bandsaw blade 29 smoothly runs between bandsaw blade wheels 21 and 23 while being guided by the movable guide arm 33, and at the same time its vibrations are suppressed by the roller 183 of the vibration prevention device 175.

In the above disclosed embodiment, instead of the roller 183, a pair of rollers which will hold the bandsaw blade therebetween may be used.

Although a preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A bandsaw blade guide device mounted on an end of a bandsaw guide arm, for guiding a bandsaw blade running between a pair of bandsaw wheels, comprising:
    a first supporting member mounted on the guide arm, free to contact a first side of the bandsaw blade;
    a second supporting member mounted on the guide arm, free to contact a second side of the bandsaw blade, and facing the first supporting member across the bandsaw blade;
    a plate spring mounted on the second supporting member so as to extend at least in a travelling direction of the bandsaw blade;
    a first roller mounted on a free end of the plate spring, free to contact the second side of the bandsaw blade at a position away from the second supporting member in the travelling direction of the bandsaw blade;
    a pressure applying device mounted on the guide arm, for applying pressure to the second supporting member and the first roller together, to hold the bandsaw blade between the first supporting member and the second supporting member, and to push the first roller against the second side of the bandsaw blade.

2. The bandsaw blade guide device of claim 1, wherein the plate spring is arranged such that when a pressure is applied to the second supporting member and the first roller by the pressure applying device, the first roller first contacts the bandsaw blade and then the plate spring deforms until the second supporting member contacts the bandsaw blade, pushing the first roller against the second side of the bandsaw blade.

3. The bandsaw blade guide device of claim 1, wherein the plate spring is fixed to the second supporting member by a bolt.

4. The bandsaw blade guide device of claim 1, further comprising a second roller mounted on the guide arm, facing the first roller across the bandsaw blade, and free to contact the first side of the bandsaw blade.

5. The bandsaw blade guide device of claim 1, further comprising a pair of guide pins mounted on the guide arm, for supporting the second supporting member so as to be movable back and forth relative to the second side of the bandsaw blade.

6. The bandsaw blade guide device of claim 5, wherein the pressure applying device is a hydraulic cylinder including a piston rod for pushing the second supporting member toward the second side of the bandsaw blade.

7. The bandsaw blade guide device of claim 5, wherein the plate spring is supported by the guide pin in a direction parallel to a plane of the bandsaw blade.

* * * * *